United States Patent
Sangsefidi et al.

(10) Patent No.: US 10,879,832 B2
(45) Date of Patent: Dec. 29, 2020

(54) METHOD FOR DETECTION OF E-MOTOR OPEN-PHASE PROBLEM IN ELECTRIFIED POWERTRAIN

(71) Applicant: KARMA AUTOMOTIVE LLC, Irvine, CA (US)

(72) Inventors: Younes Sangsefidi, Irvine, CA (US); Saleh Ziaieinejad, Irvine, CA (US); Geng Niu, Irvine, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 0 days.

(21) Appl. No.: 16/399,959

(22) Filed: Apr. 30, 2019

(65) Prior Publication Data

US 2020/0328716 A1    Oct. 15, 2020

Related U.S. Application Data

(60) Provisional application No. 62/833,739, filed on Apr. 14, 2019.

(51) Int. Cl.
| | | |
|---|---|---|
| *H02P 29/024* | (2016.01) | |
| *B60L 3/00* | (2019.01) | |
| *B60K 6/26* | (2007.10) | |

(52) U.S. Cl.
CPC .......... *H02P 29/0243* (2016.02); *B60L 3/003* (2013.01); *B60K 6/26* (2013.01); *B60Y 2200/91* (2013.01); *B60Y 2200/92* (2013.01); *B60Y 2400/60* (2013.01); *B60Y 2400/61* (2013.01)

(58) Field of Classification Search
CPC .................................. H02P 27/08; H02P 6/10
USPC ........................................... 318/400.01, 700
See application file for complete search history.

(56) References Cited

U.S. PATENT DOCUMENTS

| | | | | |
|---|---|---|---|---|
| 8,497,651 B2* | 7/2013 | Tang | ................... | G01R 31/343 318/474 |
| 9,575,127 B2* | 2/2017 | Kezobo | ................ | B62D 5/0487 |
| 9,780,712 B2* | 10/2017 | Mori | ..................... | B62D 5/046 |

* cited by examiner

*Primary Examiner* — David Luo
(74) *Attorney, Agent, or Firm* — Gordon Rees Scully; Mansukhani, LLP

(57) ABSTRACT

Systems and configurations for open phase detection of a motor in a vehicle by a current detection module having a logic gate configuration. In one embodiment, a detection unit coupled to a control unit includes a current detection module configured to measure at least one current value of each phase of the multi-phase electric motor the vehicle. The current detection module compares current values of each phase to at least one reference value to determine an open phase condition. Current values are compared by digital logic components of the current detection module, and the control unit is configured to control operation of the motor in response to the open phase condition. An open phase condition is detected based on at least one phase current having a near zero level and an unchanged current component for one phase.

18 Claims, 3 Drawing Sheets

METHOD FOR DETECTION OF E-MOTOR OPEN-PHASE PROBLEM IN ELECTRIFIED POWERTRAIN

CROSS REFERENCE TO RELATED APPLICATIONS

The present application claims priority to and the benefit of U.S. Provisional Patent Application No. 62/833,739, filed on Apr. 14, 2019. The foregoing provisional application is incorporated by reference herein in its entirety.

BACKGROUND

The present disclosure relates motor control systems for vehicles and detecting open phase conditions.

Hybrid electric and electric vehicles having electric motor power sources can employ one or more motor drive units. Assessing motor operation typically includes the use of an inverter to assess motor operation. As a result, averages of motor use are required to assess motor operating parameters. These conventional processes do not allow for assessment of a vehicle without measuring motor output over time to generate motor averages. In addition, the conventional techniques using motor averages do not allow for low speed assessment or for motors at rest to be analyzed. There exists a need for detection of open phase conditions in vehicles that overcomes drawbacks of the conventional systems and allows for detection over multiple speeds.

SUMMARY

Disclosed and claimed herein are methods, devices and systems for open phase detection of vehicle motors. In one embodiment, a system configuration includes a control unit, and a detection unit coupled to the control unit. The detection unit includes a current detection module configured to measure at least one current value of each phase of the multi-phase electric motor the vehicle. The current detection module compares current values of each phase to at least one reference value to determine an open phase condition. Current values are compared by digital logic components of the current detection module. The current detection module indicates to the control unit an open phase condition. The control unit is configured to control operation of the motor in response to the open phase condition detected.

In one embodiment, the detection unit is configured to detect open phase conditions for a plurality of motor speeds including zero motor speed and a high rate of motor rotational speed.

In one embodiment, the open phase condition is an open phase fault.

In one embodiment, an open phase condition is detected based on at least one phase current having a near zero level and an unchanged current component for one phase.

In one embodiment, comparing current values of each phase to at least one reference value includes comparison to a predetermined current threshold.

In one embodiment, the detection unit outputs a digital logic output to the control unit.

In one embodiment, detection unit includes a first current reference for a first phase path of the motor and a second current reference for a second phase path of the motor.

In one embodiment, a first phase path of the motor includes a dual path configuration including a first and second comparator, wherein the first and second comparator each compare the phase path to a fixed current value representation.

In one embodiment, the detection unit includes a gated output with a feedback loop configured to output each a current measurement phase of the motor.

In one embodiment, the control unit is configured to transfer the motor into a safe state when an open phase condition is detected.

Another embodiment is directed to a method for detecting an open phase condition in a vehicle. The method includes measuring, by a current detection unit of the vehicle, at least one current value of each phase of the multi-phase electric motor the vehicle. The method also includes comparing, by the current detection unit, current values of each phase to at least one reference value to determine an open phase condition. Current values are compared by digital logic components of the current detection module. The method also includes outputting, by the current detection unit, an indication to the control unit to indicate an open phase condition. The method also includes controlling, by a control unit of the vehicle, operation of a motor in response to the open phase condition detected.

In one embodiment, the detection unit detects open phase conditions for a plurality of motor speeds including zero motor speed and a high rate of motor rotational speed.

In one embodiment, the open phase condition is an open phase fault.

In one embodiment, an open phase condition is detected based on at least one phase current having a near zero level and an unchanged current component for one phase.

In one embodiment, comparing current values of each phase to at least one reference value includes comparison to a predetermined current threshold.

In one embodiment, the detection unit outputs a digital logic output to the control unit.

In one embodiment, detection unit includes a first current reference for a first phase path of the motor and a second current reference for a second phase path of the motor.

In one embodiment, the detection unit operates based on a first phase path of the motor include a dual path configuration including a first and second comparator, wherein the first and second comparator each compare the phase path to a fixed current value representation.

In one embodiment, the detection unit operates based on a gated output with a feedback loop configured to output each a current measurement phase of the motor.

In one embodiment, the control unit is configured to transfer the motor into a safe state when an open phase condition is detected.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION

Figure 2:
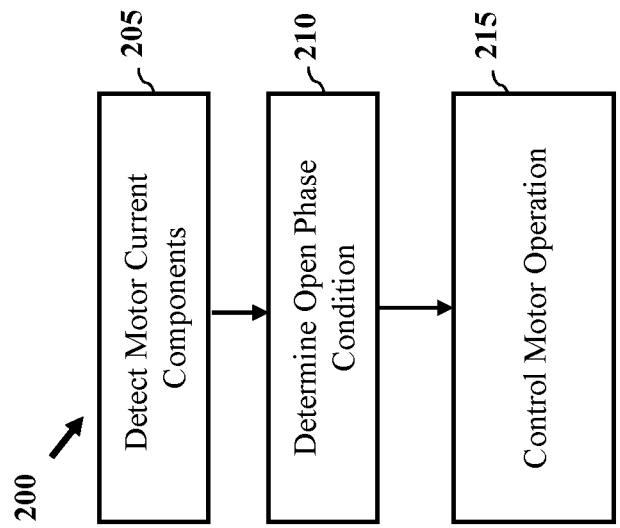
FIG. 2 depicts a process for open phase detection for an inverter motor system according to one or more embodiments.

One aspect of the disclosure is directed to vehicle systems and configurations including electrical motors. Electric motors are the heart of the powertrain of hybrid, plug-in hybrid, and electric vehicles. One of the possible fault conditions of electric motors is an open phase condition in which one of motor phases is open and does not conduct the electric current. In this abnormal condition, the motor experiences large oscillations and provides an inappropriate torque response because of the asymmetrical structure of the motor with an open phase. For high-performance applications, a control algorithm of the drive system should detect the open phase and prevent the motor from continuing operation in abnormal and dangerous conditions.

System configurations are provided to detect open phase conditions of electrical motors. In contrast to conventional methods based on the integration of motor phase currents over a half or full cycle—requiring calculation for a long time at low speeds, open phase detection is provided according to one or more embodiments in both low speeds and even at zero speed using a logic gate configuration. Configurations discussed herein can overcome the error of integrator output using medium-frequency sampling at very high speeds.

In one embodiment, an open phase detection process is provided for induction and synchronous motor drives. The process does not need a speed-dependent integration process. According to one embodiment, a process is provided that uses logic gates and has a performance independent of the motor operation performance. As a result, improved performance is provided in a whole speed range of the electric motor (including zero speed).

According to one embodiment, a system includes a current detection unit configured based on the behavior of the phase shift between the current components of the motor in the synchronous motor. Open phase conditions may be detected when one of the current components of a motor is measured to be displaced from a reference value. According to another embodiment, an open phase condition may be reported when one of three phase currents of the electric motor is sensed very close to zero and the reference values of the current components compared to the last sampling instant are unchanged (to prevent the proposed open phase algorithm from interfering with normal transient operation of the system).

Advantages of the configurations and processes discussed herein do not require use of an integrator of current measurements. In addition, embodiments do not depend on the motor speed (or equivalently its frequency). The processes and configurations provide robust performance in the range of very low speeds (even zero speed during vehicle startup) to very high speeds without needing a high-frequency sampling.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Figure 1:
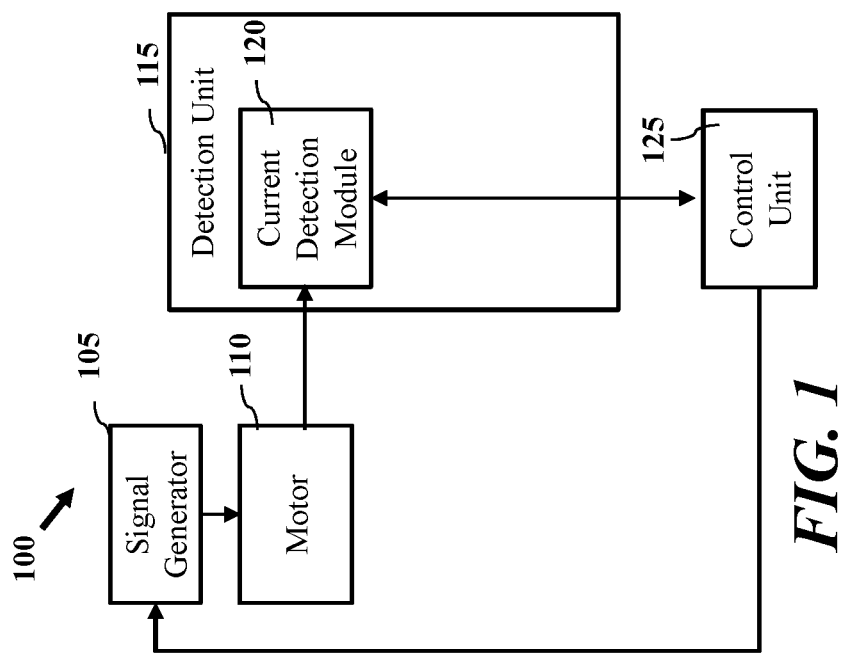
FIG. 1 depicts a graphical representation of a system according to one or more embodiments.

Referring now to the figures, FIG. 1 depicts a graphical representation of a system according to one or more embodiments. In one embodiment, system 100 is configured to detect an open phase condition of a motor. In certain embodiments, system 100 may be configured for a hybrid electric vehicle.

System 100 includes signal generator 105, motor 110, detection unit 115, and control unit 120. Signal generator 105 may be configured to control speed of motor 110. Detection unit 115 is configured to detect an open phase condition independent of the speed of motor 105. Motor 105 and references to a motor herein may relate to a multi-phase electric motor. It should be appreciated that the principles of the disclosure may relate to other three phase electrical machines.

In one embodiment, system 100 includes is configured to detect an open phase condition of motor 110. According to another embodiment, phase shift between the current components of motor 110 are detect by detection unit 115. According to another embodiment, detection unit 115 uses logic gates and has a performance independent of the motor operation performance of motor 110. As such, detection unit 115 provides detection of open phase conditions in the whole speed range of the motor 110 (even at zero speed).

Detection unit 115 includes a current detection module 120 configured to monitor current components of motor 110. Current detection module 120 may receive current values from each phase of motor 110 and convert the current values from analog to digital values for assessment by way of digital logic. Conversion of current values of motor 110 to digital representations can overcome the need of an inverter and can allow for current assessment when motor speeds are zero as wheel as during motor operation. When current components of motor 110 are determined to be far from one or more reference values, current detection module 120 can report an open phase condition for control unit 125. According to one embodiment, current detection module 120 may use the digital logic configuration shown in FIG. 4. According to another embodiment, current detection module 120 may detect an open phase condition when one of three phase currents of the electric motor 110 are sensed very close to zero, and/or when the reference values of the current components compared to the last sampling instant are unchanged (to prevent the proposed open phase algorithm from interfering with normal transient operation of the system). Based on an open phase condition, control unit 120 may direct operation of motor 110. In certain embodiments, control unit 125 may output control signals to signal generator 105 based on the detected open phase condition to control operation of motor 110.

FIG. 2 depicts a process for open phase detection for an inverter motor system according to one or more embodiments. According to one embodiment, process 200 may be employed by a current detection module (e.g., current detection module 120) of a vehicle detection unit to detect an open phase condition of a motor in a vehicle. In certain embodiments, process 200 may be performed by a control unit of a vehicle.

Process 200 includes detecting motor currents at block 205. Current may be detected from each phase of a three-phase electric motor of a vehicle across a range of speeds, including while the vehicle is at rest, in motion, etc. In certain embodiments, the detection unit may monitor multiple motor units of a vehicle. At block 205, a current detection unit of the vehicle can measure at least one current value of each phase of the multi-phase electric motor the vehicle. The current values of each phase may be compared to at least one reference value to determine an open phase condition. According to one embodiment, current values are compared by digital logic components of the current detection module.

Figure 4:
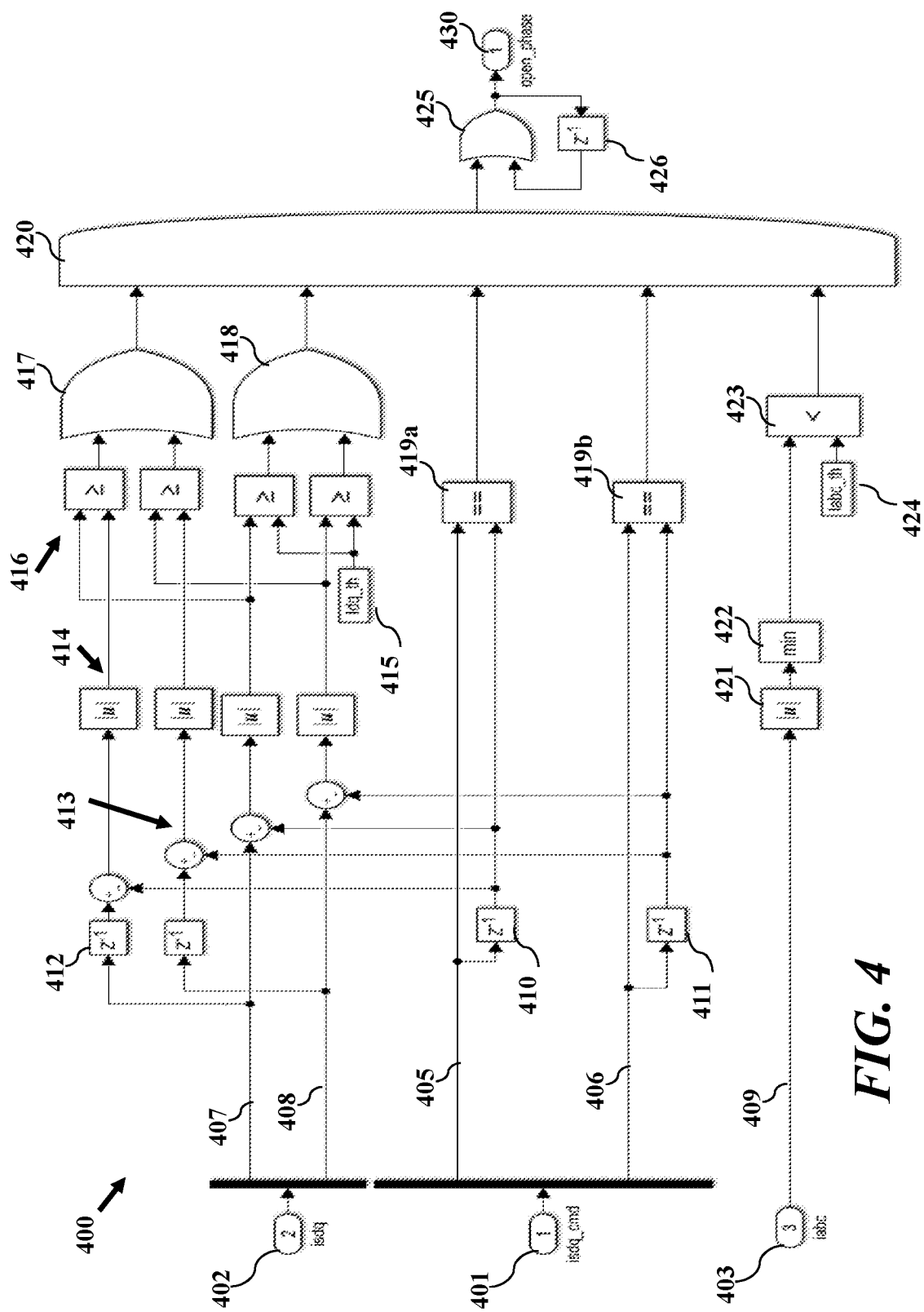
FIG. 4 depicts a graphical representation of open phase detection according to one or more embodiments.

At block 210, the detection unit can detect an open phase condition based on current components of motor relative to one or more reference elements using digital logic of the detection unit (e.g., open phase detection logic of FIG. 4). In one embodiment, an open phase condition is detected based on at least one phase current having a near zero level and an unchanged current component for one phase. Current values of each phase may be compared to at least one reference value includes comparison to a predetermined current threshold. The detection unit can include a first current reference for a first phase path of the motor and a second current reference for a second phase path of the motor. According to another embodiment, the detection unit operates based on a first phase path of the motor include a dual path configuration including a first and second comparator, wherein the first and second comparator each compare the phase path to a fixed current value representation. The detection unit operates based on a gated output with a feedback loop configured to output each a current measurement phase of the motor. Based on output of the digital logic configuration, the detection unit outputs a digital logic output to the control unit at block 210.

At block 215, a control unit of a vehicle can control motor operation based on detection of an open phase condition. In one embodiment, the current detection unit outputs an indication to the control unit to indicate an open phase condition. The detection unit can detect open phase conditions for a plurality of motor speeds including zero motor speed and a high rate of motor rotational speed. According to another embodiment, the open phase condition is an open phase fault. Process 200 can include control operation of a motor at block 215 by the control unit of the vehicle controlling motor operation in response to the open phase condition detected. The control unit may be configured to transfer the motor into a safe state when an open phase condition is detected.

Figure 3:
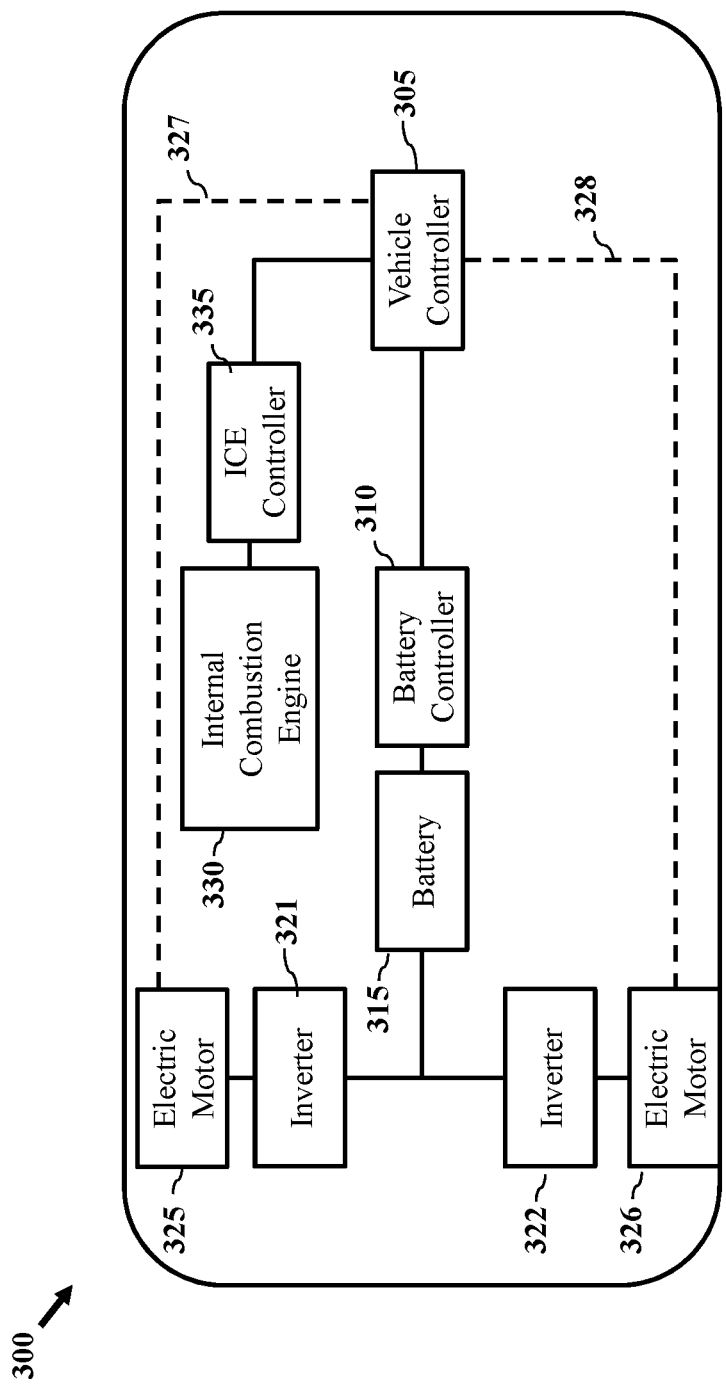
FIG. 3 depicts a graphical representation of a vehicle configuration according to one or more embodiments.

FIG. 3 depicts a graphical representation of a vehicle configuration according to one or more embodiments. According to one embodiment, vehicle configuration is provided including one or more components and configurations for detection of open phase conditions of the electric motor. According to one embodiment, vehicle 300 includes vehicle controller 305, battery controller 310, and battery 315. Battery 315 may driver inverters 321 and 322 which may supply electric motors 325 and 326, respectively. In certain embodiments, vehicle 300 is a hybrid electric vehicle and includes an internal combustion engine (ICE) 330 and ICE controller 335. In certain embodiments, vehicle 300 is an electric vehicle ICE 330 and ICE controller 335 are optional.

According to one embodiment, vehicle 300 may include a current detection module (e.g., current detection module 120) configured to detect open phase conditions for each of motors 325 and 326. In certain embodiments, vehicle controller 305 is coupled by way of connections 327 and 328 to motors 325 and 326. Vehicle 300 may also be configured to include current detection modules in one or more components to detect open phase conditions. In certain embodiments, vehicle 300 may include digital logic circuitry to detect open phase conditions, such as open phase logic of FIG. 4.

FIG. 4 depicts a graphical representation of open phase detection logic according to one or more embodiments. According to one embodiment, a detection unit (e.g., detection unit 115) of a vehicle includes digital control logic to detect an open phase condition. Control configuration 400 relates to a configuration (e.g., digital logic) characterizing operation of a current detection model (e.g., current detection model 120) according to one or more embodiments. Control configuration 400 includes inputs 401, 402, and 403 to receive current representations for each phase of a three phase motor. According to one embodiment, inputs 401, 402, and 403 of control configuration 400 receive digital representations of current measurements.

According to one embodiment, input 401 relates to a command phase of a motor and includes dual paths 405 and 406. Paths 405 and 406 each include gated paths, by gates 410 and 411, respectively, that feed comparators 419a and 419b. Input 401 may be associated with a first phase path of a motor include a dual path configuration including a first and second comparators 419a and 419b. The first and second comparators 419a and 419b each compare the phase path to a fixed current value representation. Comparators 419a and 419b may relate to one or more of digital and binary comparators made from AND, NOR and NOT gates that compare the digital signals present at input terminals and to produce output depending upon the input. Comparators 419a and 419b may identify comparators or magnitude comparators. For example, as an identity comparator, the digital comparator may have a single output terminal to indicate inputs as being equal (e.g., A=B=1 (HIGH) or A=B=0 (LOW)). Comparators 419a and 419b can allow for current values of a motor phase associated with input 401 to be compared to a constant or unknown value.

Input 402 relates to a second phase output of a motor and includes dual paths 407 and 408. Paths 407 and 408 each include gated paths, by gates 412 and summing gates 413. Input to comparators 413 also includes output of paths 405 and 406. Paths 407 and 408 then feed magnitude comparators 414. Current reference 415 along with output of magnitude comparators 414 feed binary gates 416 and dual OR gates 417 and 418. Binary gates 416 may be magnitude comparators to indicate that an input is greater or equal to the other input. Binary gates may be comparators to current phases to a constant current reference, such as current reference 415 to produce an output condition or flag depending upon the result of the comparison. Gates 417 and 418 feed gate 420. Comparators 419a and 419b also feed gate 420.

According to one embodiment, phase input 403 includes path 409 feeding gate 421, functioning as a magnitude comparator, in series gate 422 to determine a minimum representation. Reference current 424 feeds gate 423 to functioning as a comparator of current for input 403. Output of gate 423 feeds gate 420. Gate 420 may be configured to receive logic values assessing inputs of all phases to one or more current references to determine whether the current values are offset from the reference currents. An open phase condition is detected based on at least one phase current having a near zero level and an unchanged current component for one phase. Gate 420 compares output of current values of each phase. For example, gates 417 and 418, and gate 423 compare current to reference current values. As such logic 400 includes unit includes a first current reference for a first phase path (input 402) of the motor and a second current reference for a second phase path (403) of the motor.

Gates 419a and 491b include comparison to a predetermined current threshold to output a digital logic output gate 420. Output of gate 420 feeds OR gate 425 having a feedback loop with gate 426. Output of gate 420 can indicate to a control unit an open phase condition. Output 430 can function as a gated output with a feedback loop configured to output each a current measurement phase of the motor. Output 430 indicates an open phase condition with a high logic value (e.g., logic value of 1) to a control unit.

While this disclosure has been particularly shown and described with references to exemplary embodiments thereof, it will be understood by those skilled in the art that various changes in form and details may be made therein without departing from the scope of the claimed embodiments.

What is claimed is:

1. An open phase detection system for a vehicle, the system comprising: a control unit; and
    a detection unit coupled to the control unit, the detection unit including a current detection module configured to measure at least one current value of each phase of the multi-phase electric motor the vehicle,
    compare current values of each phase to at least one reference value to determine an open phase condition, wherein current values are compared by digital logic components of the current detection module, and
    output an indication to the control unit to indicate an open phase condition,
    wherein the control unit is configured to control operation of the motor in response to the open phase condition detected; and
    wherein an open phase condition is detected based on at least one phase current having a near zero level and an unchanged current component for one phase.

2. The system of claim 1, wherein the detection unit is configured to detect open phase conditions for a plurality of motor speeds including zero motor speed and a high rate of motor rotational speed.

3. The system of claim 1, wherein the open phase condition is an open phase fault.

4. The system of claim 1, wherein comparing current values of each phase to at least one reference value includes comparison to a predetermined current threshold.

5. The system of claim 1, wherein the detection unit outputs a digital logic output to the control unit.

6. The system of claim 1, wherein a first phase path of the motor includes a dual path configuration including a first and second comparator, wherein the first and second comparator each compare the phase path to a fixed current value representation.

7. The system of claim 1, wherein the detection unit includes a gated output with a feedback loop configured to output each a current measurement phase of the motor.

8. The system of claim 1, wherein the control unit is configured to transfer the motor into a safe state when an open phase condition is detected.

9. An open phase detection system for a vehicle, the system comprising: a control unit; and
    a detection unit coupled to the control unit, the detection unit including a current detection module configured to measure at least one current value of each phase of the multi-phase electric motor the vehicle,
    compare current values of each phase to at least one reference value to determine an open phase condition, wherein current values are compared by digital logic components of the current detection module, and
    output an indication to the control unit to indicate an open phase condition,
    wherein detection unit includes a first current reference for a first phase path of the motor and a second current reference for a second phase path of the motor; and
    wherein the control unit is configured to control operation of the motor in response to the open phase condition detected.

10. A method for detecting an open phase condition in a vehicle, the, the method comprising:
    measuring, by a current detection unit of the vehicle, at least one current value of each phase of the multi-phase electric motor the vehicle;
    comparing, by the current detection unit, current values of each phase to at least one reference value to determine an open phase condition, wherein current values are compared by digital logic components of the current detection module; and
    outputting, by the current detection unit, an indication to the control unit to indicate an open phase condition;
    controlling, by a control unit of the vehicle, operation of a motor in response to the open phase condition detected; and
    wherein the detection unit operates based on a first phase path of the motor include a dual path configuration including a first and second comparator, wherein the first and second comparator each compare the phase path to a fixed current value representation.

11. The method of claim 10, wherein the detection unit detects open phase conditions for a plurality of motor speeds including zero motor speed and a high rate of motor rotational speed.

12. The method of claim 10, wherein the open phase condition is an open phase fault.

13. The method of claim 10, wherein an open phase condition is detected based on at least one phase current having a near zero level and an unchanged current component for one phase.

14. The method of claim 10, wherein comparing current values of each phase to at least one reference value includes comparison to a predetermined current threshold.

15. The method of claim 10, wherein the detection unit outputs a digital logic output to the control unit.

16. The method of claim 10, wherein detection unit includes a first current reference for a first phase path of the motor and a second current reference for a second phase path of the motor.

17. The method of claim 10, wherein the detection unit operates based on a gated output with a feedback loop configured to output each a current measurement phase of the motor.

18. The method of claim 10, wherein the control unit is configured to transfer the motor into a safe state when an open phase condition is detected.

* * * * *